United States Patent
Ishikawa et al.

(10) Patent No.: US 7,764,044 B2
(45) Date of Patent: Jul. 27, 2010

(54) MOTOR DRIVING APPARATUS CAPABLE OF DRIVING MOTOR WITH RELIABILITY

(75) Inventors: Tetsuhiro Ishikawa, Nishikamo-gun (JP); Hiroshi Yoshida, Chiryuu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 273 days.

(21) Appl. No.: 11/632,727

(22) PCT Filed: Aug. 3, 2005

(86) PCT No.: PCT/JP2005/014616

§ 371 (c)(1),
(2), (4) Date: Jan. 18, 2007

(87) PCT Pub. No.: WO2006/014016

PCT Pub. Date: Feb. 9, 2006

(65) Prior Publication Data

US 2008/0067973 A1 Mar. 20, 2008

(30) Foreign Application Priority Data

Aug. 4, 2004 (JP) .............................. 2004-228021

(51) Int. Cl.
*H02J 7/14* (2006.01)
*H02J 7/00* (2006.01)
*H02J 1/12* (2006.01)
*H02J 3/00* (2006.01)
*H02J 7/04* (2006.01)

(52) U.S. Cl. ........................ 320/104; 320/103; 320/132; 320/162; 307/45; 307/46

(58) Field of Classification Search ................. 320/103, 320/104, 127, 128, 137, 138; 307/10.1
See application file for complete search history.

(56) References Cited

U.S. PATENT DOCUMENTS

| 5,796,175 | A  | * | 8/1998 | Itoh et al. | .................. | 307/10.1 |
| 6,737,756 | B1 | * | 5/2004 | Gale et al. | ..................... | 290/7 |
| 2003/0117113 | A1 | * | 6/2003 | Takemasa et al. | ........... | 320/150 |
| 2003/0141123 | A1 | * | 7/2003 | Sugiura et al. | ............. | 180/65.2 |

FOREIGN PATENT DOCUMENTS

| JP | 05-328530 A | 12/1993 |
| JP | 08-093517 A | 4/1996 |
| JP | 08-196006 A | 7/1996 |
| JP | 09-046921 A | 2/1997 |
| JP | 10-075502 A | 3/1998 |

(Continued)

*Primary Examiner*—Edward Tso
*Assistant Examiner*—Ahmed Omar
(74) *Attorney, Agent, or Firm*—Kenyon & Kenyon LLP

(57) ABSTRACT

DC/DC converter is connected directly to a main battery with no system relays intervening therebetween. The DC/DC converter drops and then supplies the voltage of a power supplied from the high voltage main battery to a subsidiary battery. A DC/DC converter control circuit receives a supply of the power from the main battery to control the dropping operation of the DC/DC converter. Even when the subsidiary battery goes dead, the DC/DC converter is responsive to a control signal outputted from the DC/DC converter control circuit using, as its power supply, the main battery, to perform a boosting operation, thereby quickly charging the subsidiary battery.

5 Claims, 6 Drawing Sheets

FOREIGN PATENT DOCUMENTS

| | | |
|---|---|---|
| JP | 11-150878 A | 6/1999 |
| JP | 11-332012 A | 11/1999 |
| JP | 2001-145275 A | 5/2001 |
| JP | 2002-67705 A | 3/2002 |
| JP | 2002067705 A * | 3/2002 |

* cited by examiner

MOTOR DRIVING APPARATUS CAPABLE OF DRIVING MOTOR WITH RELIABILITY

This is a 371 national phase application of PCT/JP2005/014616 filed 03 Aug. 2005, which claims priority to Japanese Patent Application No. 2004-228021 filed 04 Aug. 2004, the contents of which are incorporated herein by reference.

FIELD OF THE INVENTION

The present invention relates to a motor driving apparatus for driving a motor and, more specifically, to a motor driving apparatus capable of driving the motor with reliability even when a subsidiary battery goes dead.

BACKGROUND OF THE INVENTION

Recently, hybrid vehicles and electric vehicles have attracting attention as environmentally friendly vehicles. A hybrid vehicle is a vehicle having, as a power source, a DC power supply, an inverter and a motor driven by the inverter, in addition to a conventional engine. Specifically, the power source is obtained by driving the engine and, further, a DC voltage from the DC power supply is converted by the inverter to an AC voltage and the motor is rotated by the converted AC voltage, whereby the power source is obtained.

An electric vehicle is a vehicle having, as the power source, a DC power supply, an inverter and a motor driven by the inverter.

In the hybrid vehicle or the electric vehicle as such, a configuration has been studied in which the DC voltage from the DC power supply is boosted by a boosting converter, and the boosted DC voltage is supplied to the inverter for driving the motor.

FIG. 6 is a schematic block diagram showing an example of a conventional motor driving apparatus.

Referring to FIG. 6, the motor driving apparatus includes a main battery MB, system relays SR1, 2, a boosting converter 101, an inverter 102, a DC/DC converter 110, a subsidiary battery SB, and a control unit 120.

Main batter MB outputs a DC voltage. System relays SR1, SR2 supply, when turned on by a signal SE from control unit 120, the DC voltage from main battery MB to DC/DC converter 110.

Boosting converter 101 boosts the DC voltage supplied from main battery MB by the control from control unit 120, and supplies the boosted DC voltage to inverter 102.

Receiving the DC voltage supplied from boosting converter 101, inverter 102 converts the DC voltage to an AC voltage under the control by control unit 120, and drives motor generator MG. Consequently, motor generator MG is driven to generate torque designated by a torque command value TR. Current sensor 104 detects a motor current MCRT flowing in each phase of motor generator MG, and outputs the detected motor current MCRT to control unit 120.

DC/DC converter 110 lowers the DC voltage supplied from main battery MB through system relays SR1 and SR2, in response to a control signal from control unit 120, and supplies the lowered DC voltage to subsidiary battery SB. Subsidiary battery SB stores the supplied DC voltage and outputs a DC voltage for driving subsidiary electric components, not shown.

Based on the DC voltage of main battery MB, the motor current MCRT from current sensor 104 and the like, control unit 120 generates signals PWC, PWM for controlling boosting converter 101 and inverter 102, and outputs the generated signals PWC and PWM to boosting converter 101 and inverter 102, respectively. Further, control unit 120 generates a control signal for controlling DC/DC converter 110, and outputs the signal to DC/DC converter 110.

In this manner, the motor driving apparatus mounted on a hybrid vehicle or an electric vehicle boosts the DC voltage from main battery MB and drives the motor generator MG to generate prescribed torque, and lowers the DC voltage from main battery MB to charge subsidiary battery SB.

Though not shown, subsidiary electric components receiving power supply from subsidiary battery SB and driven thereby include an electrical control unit (ECU) controlling running of the vehicle, lighting, air conditioner, power window and audio system.

Among the vehicles having the motor driving apparatus shown in FIG. 6 mounted thereon, particularly in a hybrid vehicle, the power stored in main battery MB is used for starting engine operation. Specifically, the electric power is supplied from the main battery MB to motor generator MG coupled to the engine (not shown), and by driving the motor generator MG as a motor, the engine operation is started.

Further, for the motor driving apparatus mounted on a hybrid vehicle, a configuration in which a starter motor is driven by using a subsidiary battery at the time of starting engine operation has been disclosed (for example, in Japanese Patent Laying-Open Nos. 11-332012, 10-75502 and 8-93517).

FIG. 7 is a schematic block diagram showing another example of the conventional motor driving apparatus described in Japanese Patent Laying-Open No. 11-332012.

Referring to FIG. 7, an engine 210 is connected to a front wheel 216 through a transmission 212 and an axle 214. By an output of engine 210, front wheel 216is driven.

Engine 210 is driven by a starter motor 230, and starter motor 230 is driven by electric power of a subsidiary battery 220. Subsidiary battery 220 is charged by electric power generated by an alternator 219 driven by the output of engine 210.

The electric power of subsidiary battery 220 is boosted by a DC/DC converter 232, and the boosted electric power is stored in a capacitor (or condenser) 224. From capacitor 224, the electric power is supplied to left and right wheel motors 226 through an inverter 234. Thus, rear wheels 228 are driven.

In the configuration described above, when an ignition switch (not shown) is turned on and system ECU 236 is activated, an engine start control is performed. Specifically, electric power is supplied from subsidiary battery 220 to starter motor 230, starter motor 230 rotates, and the rotating force causes cranking of engine 210. Further, when start of operation of engine 210 is confirmed, the system related to wheel motor 226 is activated and running control is performed.

With such a control for starting engine operation, however, if the amount of electricity stored in subsidiary battery 220 should decrease in cold climate or because of degraded battery performance, sufficient electric power would not be supplied to starter motor 230, resulting in lower performance of engine start.

Therefore, in the motor driving apparatus of FIG. 7, a connection switching apparatus 238 is provided to selectively connect starter motor 230 either to subsidiary battery 220 or to capacitor 224. This enables switching of power supply source applying electric power to starter motor 230 between subsidiary battery 220 and capacitor 224, ensuring reliable starting of engine operation. Connection switching apparatus 238 is controlled by system ECU 236.

In a hybrid vehicle mounting the conventional motor driving apparatus as described above, a problem may arise that the vehicle system cannot be activated when the amount of electricity storage in the subsidiary battery decreases significantly, that is, when the subsidiary battery goes dead.

Specifically, in the motor driving apparatus shown in FIG. 6, the engine is started by driving motor generator MG as a motor. However, since control unit 120 controlling the motor driving apparatus as a whole uses the subsidiary battery SB as the power source, when the subsidiary battery goes dead, system relays SR1 and SR2 are not turned on, and therefore, electric power supply from main battery MB to boosting converter 100 and DC/DC converter 110 would be stopped. Therefore, motor generator MG cannot be driven and the engine cannot be started.

In the motor driving apparatus shown in FIG. 7, when the amount of electricity stored in subsidiary battery 220 decreases, though it is possible to supply electric power from capacitor 224 to starter motor 230 by using connection switching apparatus 238, system ECU 236 controlling the connection switching apparatus 238 would be inoperative when the subsidiary battery goes dead, making it difficult to start engine operation.

As described above, in either of the conventional motor driving apparatuses shown in FIGS. 6 and 7, run-out of subsidiary battery hinders starting of engine operation. Therefore, the driver of the vehicle must charge the subsidiary battery as soon as possible using a charging facility, as a countermeasure to the run-out of subsidiary battery.

On the other hand, even though the high-voltage main battery MB used for running the vehicle holds a sufficient amount of electricity to drive the motor generator MG, there is no means for effectively use the stored electricity when the vehicle system cannot be activated.

Japanese Patent Laying-Open No. 8-93517 discloses means for inhibiting, when the engine cannot be started as the voltage of subsidiary battery goes low, re-starting of operation of the starter motor of relatively large power consumption and allowing running with the electric power stored in the battery for running. Only with the battery for running, however, the range of running is significantly limited, and therefore, it is not guaranteed whether travel to a maintenance shop or the like, where charging facility is available, is possible or not.

Therefore, the present invention was made to solve such problems and its object is to provide a motor driving apparatus capable of driving the motor in a simple and reliable manner, even when the subsidiary battery goes dead.

SUMMARY OF THE INVENTION

The present invention provides a motor driving apparatus, including a first power source, a driving circuit receiving supply of electric power from the first power source and driving a motor, a second power source charged by receiving a second DC voltage lower than a first DC voltage output from the first power source, a voltage converter converting the first DC voltage to the second DC voltage between the first power source and the second power source, and a converter control circuit controlling the voltage converter. The converter control circuit is connected to the first power source and operates using the first DC voltage as a power supply voltage.

Preferably, the motor driving apparatus further includes a driving circuit control circuit receiving and driven by electric power supply from the second power source, controlling the driving circuit and inputting a trigger signal for activating the converter control circuit to the converter control circuit, and trigger signal generating means for generating the trigger signal and inputting the signal to the converter control circuit, when amount of charges stored in the second power source is lower than a prescribed amount.

Preferably, the prescribed amount is an amount of electric power supply necessary for driving the driving circuit control circuit.

Preferably, the trigger signal generating means includes a third power source for generating the trigger signal, and a switch indicating a timing of input of the trigger signal generated by the third power source.

Preferably, the first power source, the second power source, the voltage converter, the converter control circuit, the driving circuit control circuit and the trigger signal generating means are housed integrally in one box. The motor driving apparatus further includes a cooling apparatus for cooling the box.

Therefore, the present invention realizes a motor driving apparatus capable of supplying electric power to the motor in a simple and reliable manner without requiring a charging facility, even when the subsidiary battery goes dead.

DETAILED DESCRIPTION

Figure 1:
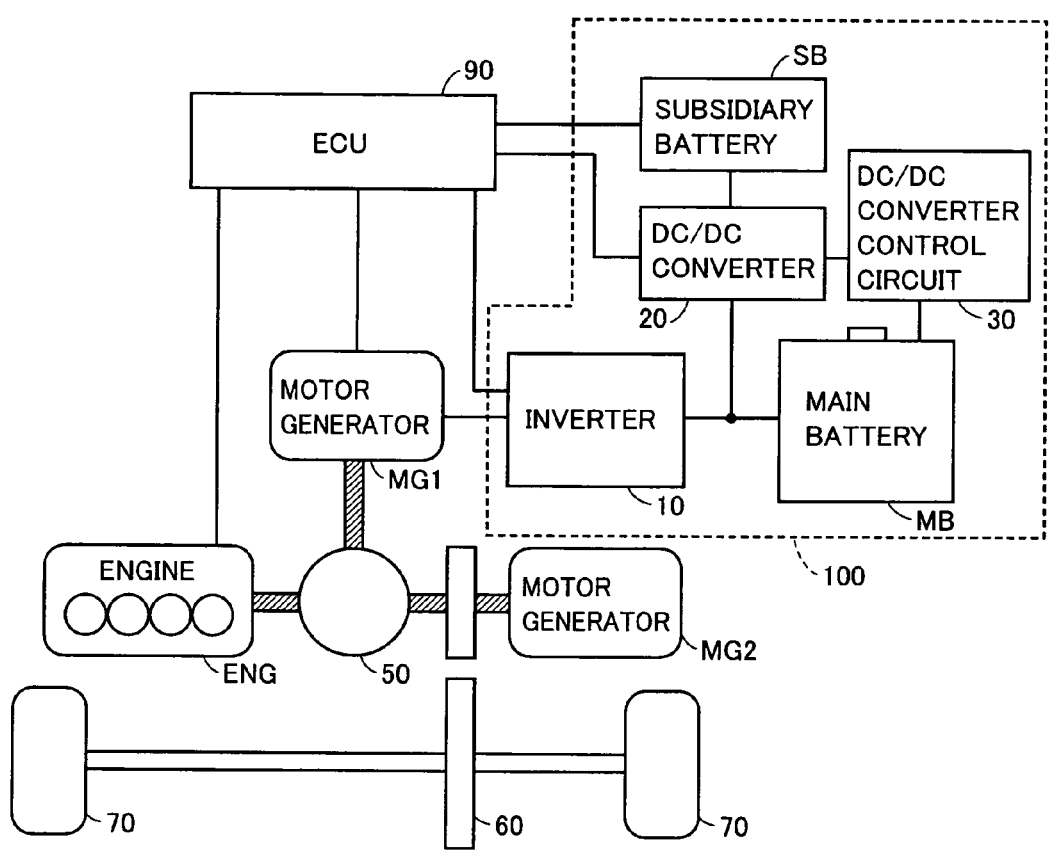
FIG. 1 is a control block diagram showing a vehicle mounting the motor driving apparatus in accordance with an embodiment of the present invention.

In the following, embodiments of the present invention will be described in detail, with reference to the figures. Throughout the figures, the same reference characters denote the same or corresponding portions.

FIG. 1 is a control block diagram showing a vehicle mounting the motor driving apparatus in accordance with an embodiment of the present invention.

Referring to FIG. 1, the vehicle is a hybrid vehicle having an engine and a motor as power sources, and it includes an engine ENG, a motor generator MG1, a motor generator MG2, an inverter unit 10, a main battery MB, a power splitting mechanism 50, reduction gears 60, wheels 70 and an ECU 90.

Engine ENG generates driving force using burning energy from fuel such as gasoline as a source. The driving force generated by engine ENG is divided to two paths by power splitting mechanism 50 as shown by thick, hatched lines of FIG. 1. One path is for transmission to a driving shaft driving the wheels 70 through reduction gears 60. The other path is for transmission to motor generator MG1.

Motor generators MG1 and MG2 may function both as a generator and an electric motor. As will be described in the following, motor generator MG1 mainly operates as a generator, and motor generator MG2 mainly operates as an electric motor.

Specifically, motor generator MG1 is a three-phase AC rotating machine, and it is used as a starter for starting the operation of engine ENG at the time of acceleration. At this time, motor generator MG1 receives electric power supply from at least one of main battery MB and subsidiary battery SB and is driven as an electric motor, causing cranking of the engine ENG to start operation.

Further, after the start of engine operation, motor generator MG1 is rotated by the driving force of engine ENG transmitted through power splitting mechanism 50, and generates electric power.

The electric power generated by motor generator MG1 is used differently dependent on the state of running of the vehicle or on SOC (State of Charge) of main battery MB. By way of example, during normal running or rapid acceleration, the electric power generated by motor generator MG1 is directly used as the electric power for driving motor generator MG2. When the SOC of main battery MB is lower than a prescribed value, the electric power generated by motor generator MG1 is converted by inverter unit 10 from AC power to DC power, and stored in main battery MB.

Motor generator MG2 is a three-phase AC rotating machine, and it is driven by at least one of the electric power stored in main battery MB and the electric power generated by motor generator MG1. The driving force of motor generator MG2 is transmitted to the driving shaft of wheels 70 through reduction gears 60. Thus, motor generator MG2 assists the engine ENG to cause the vehicle to run, or causes the vehicle to run only by the driving force of itself.

Further, at the time of regenerative braking, motor generator MG2 is rotated by wheels 70 through reduction gears 60, and operates as a generator. At this time, the regenerative power generated by motor generator MG2 charges main battery MB through inverter unit 16.

Main battery MB is a battery for running, and it is a battery of high voltage formed by connecting in series a large number of secondary battery cells such as nickel hydride batteries or lithium ion batteries. In place of such secondary batteries, the main battery MB may be formed by a capacitor or a condenser.

Separate from the high voltage main battery MB, the vehicle further includes subsidiary battery SB for supplying power to subsidiary electric components, a DC/DC converter 20 lowering and supplying to subsidiary battery SB the power of main battery MB, and a DC/DC converter control circuit 30.

Subsidiary battery SB is, by way of example, a lead storage battery. The subsidiary electric components receiving electric power supplied from subsidiary battery SB for operation include ECUs controlling running of the vehicle, such as the engine ECU, a power train ECU and a brake ECU, lighting apparatus, ignition, and a power pump. In the following, these electric components using subsidiary battery SB as a power source will also be referred to as low-voltage parts. On the other hand, electric components using main battery MB as a power source will also be referred to as high-voltage parts.

DC/DC converter 20 is a bi-directional DC/DC converter capable of voltage boosting/lowering operations. Specifically, DC/DC converter 20 lowers the voltage of electric power supplied from main battery MB and supplies the result to subsidiary battery SB. Further, DC/DC converter 20 boosts the electric power supplied from subsidiary battery SB and supplies the result to motor generator MG1 through inverter unit 10.

DC/DC converter control circuit 30 controls the voltage boosting and lowering operations of DC/DC converter 20. The present embodiment is characterized in that DC/DC converter control circuit 30 is implemented as a high-voltage part that operates receiving the power supply from main battery MB. DC/DC converter control circuit 30 will be described in detail later.

ECU 90 controls overall operations of components/circuits mounted on the vehicle, so that the vehicle mounting the motor driving apparatus of the present embodiment is driven in accordance with an instruction by the driver. Specifically, in a CPU (Central Processing Unit) contained in ECU 90, operations are performed, based on a prescribed program, on various pieces of information such as state of running of the vehicle, accelerator position, rate of change of the accelerator position, throttle open position, shift position, SOC of the main battery and the like, and control signals as the result of operations are output to the components/circuits.

Figure 2:
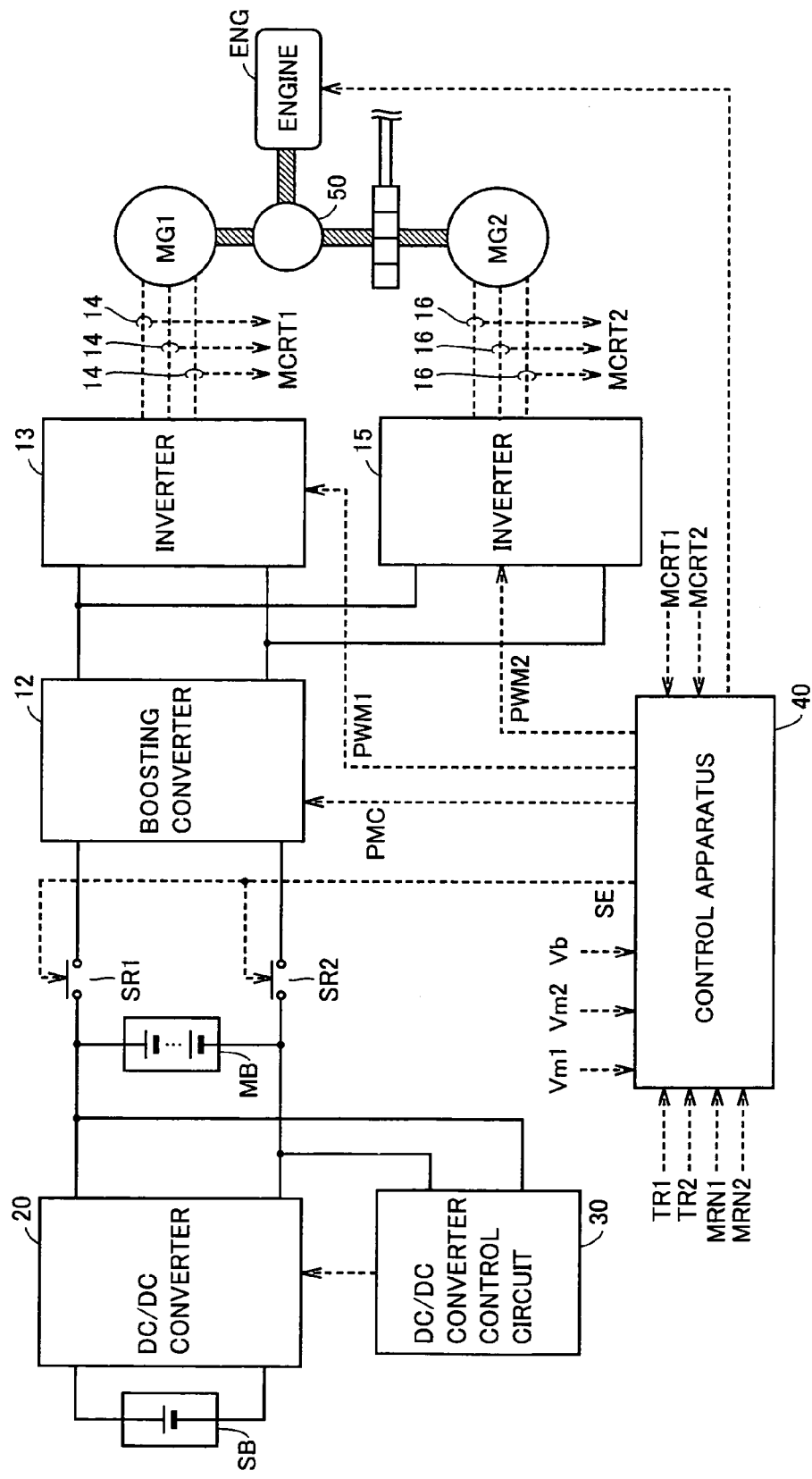
FIG. 2 is a schematic block diagram of the motor driving apparatus in accordance with an embodiment of the present invention.

FIG. 2 is a schematic block diagram of motor driving apparatus 100 in accordance with an embodiment of the present invention.

Referring to FIG. 2, motor driving apparatus 100 includes main battery MB, system relays SR1, SR2, boosting converter 12, inverters 13, 15, current sensors 14, 16, DC/DC converter 20, subsidiary battery SB, DC/DC converter control circuit 30, and a control unit 40.

As shown in FIG. 1, motor generators MG1 and MG2 may function both as a generator and an electric motor. Motor generator MG1 is driven by inverter 13. Motor generator MG2 is driven by inverter 15. These inverters 13, 15 and boosting converter 12 form inverter unit 10 shown in FIG. 1.

System relays SR1 and SR2 are turned on/off by a signal from control unit 40. More specifically, system relays SR1 and SR2 are turned on by a signal SE of H (logic high) level from control unit 40, and turned off by the signal SE of L (logic L) level from control unit 40.

Current sensor 14 detects motor current MCRT1 flowing through motor generator MG1, and outputs the detected motor current MCRT1 to control unit 40.

Current sensor 16 detects motor current MCRT2 flowing through motor generator MG2 and outputs the detected motor current MCRT2 to control unit 40.

Boosting converter 12 boosts the DC voltage supplied from main battery MB and supplies the boosted voltage to inverters 13 and 15. More specifically, receiving a signal PWC from control unit 40, boosting converter 12 supplies the DC voltage boosted in response to the signal PWC to inverters 13 and 15. Further, receiving the signal PWC from control unit 40, boosting converter 12 lowers the DC voltage supplied from inverters 13 and 15 and supplies the lowered voltage to main battery MB.

Inverter 13 is a three-phase inverter, and when a DC voltage is supplied from main battery MB through boosting converter 12, it converts the DC voltage to a three-phase AC voltage based on a control signal PWM1 from control circuit 40, and drives motor generator MG1. Thus, motor generator MG1 is driven to generate torque designated by torque command value TR1.

Similarly, inverter 15 is also a three-phase inverter, and when a DC voltage is supplied from main battery MB through boosting converter 12, it converts the DC voltage to a three-phase AC voltage based on a control signal PWM2 from control circuit 40, and drives motor generator MG2. Thus, motor generator MG2 is driven to generate torque designated by torque command value TR2.

By way of example, at the start of engine operation, inverter 13 converts the DC voltage from boosting converter 12 to an AC voltage in accordance with the signal PWM1, and drives motor generator MG1 such that the torque designated by torque command value TR1 is output. Motor generator MG1 rotates the crank shaft (not shown) of engine ENG through power splitting mechanism 50, and starts an operation of the engine ENG.

Further, when the vehicle starts running, motor generator MG1 functions as a generator that generates power by the rotating force of the started engine ENG. At this time, inverter 13 converts the AC voltage generated by motor generator MG1 to a DC voltage in response to the signal PWM1, and supplies the converted DC voltage to inverter 15. Inverter 15 receives the DC voltages from the boosting converter and from inverter 13, converts the received DC voltages to an AC voltage in response to the signal PWM2, and drives motor generator MG2 to output the torque designated by torque command value TR2.

Next, when the vehicle is running with light load, the boosting converter boosts and supplies the DC voltage from main battery MB to inverter 15, in response to the signal PWC from control unit 40. Inverter 15 converts the DC voltage from the boosting converter to an AC voltage in response to the signal PWM2, and drives motor generator MG2 so that the torque designated by torque command value TR2 is output.

Next, at the time of rapid acceleration of the vehicle, the boosting converter boosts and supplies the DC voltage from main battery MB to inverter 15, in response to the signal PWC from control unit 40. Inverter 13 converts the AC voltage generated by motor generator MG1 from the rotating force of the engine to a DC voltage, and supplies the converted voltage to inverter 15. Inverter 15 receives the DC voltages from boosting converter 12 and inverter 13, converts the received DC voltages to an AC voltage in response to the signal PWM2, and drives motor generator MG2 so that the torque designated by torque command value TR2 is output.

Finally, in regenerative braking of the vehicle, inverter 15 converts the AC voltage generated by motor generator MG2 to a DC voltage based on the signal PWM2 from control unit 40, and supplies the converted DC voltage to boosting converter 12. Receiving the signal PWC from control unit 40, boosting converter 12 lowers the DC voltage supplied from inverter 15 and charges main battery MB.

The regenerative braking here refers to braking with regeneration through a foot brake operation by a driver of the hybrid vehicle, or deceleration (or stopping acceleration) of the vehicle while regenerating power, by releasing the accelerator pedal during running, without operating the foot brake.

Control unit 40 receives torque command values TR1 and TR2 and motor rotation numbers MRN1 and MRN2 from ECU 90, receives input voltages Vm1, Vm2 of inverters 13 and 15 from a voltage sensor, not shown, and receives motor currents MCRT1 and MCRT2 from current sensors 14 and 16.

Based on the input voltage Vm1 of inverter 13, torque command value TR1 and motor current MRCT1, control unit 40 generates the signal PWM1 for controlling switching of an NPN transistor (not shown) of inverter 13 when inverter 13 drives motor generator MG1, and outputs the generated signal PWM1 to inverter 13.

Further, based on the input voltage Vm2 of inverter 15, torque command value TR2 and motor current MRCT2, control unit 40 generates the signal PWM2 for controlling switching of an NPN transistor (not shown) of inverter 15 when inverter 15 drives motor generator MG2, and outputs the generated signal PWM2 to inverter 15.

Further, control unit 40 generates a signal PWC for controlling switching of an NPN transistor (not shown) of boosting converter 12, based on inter-terminal voltage Vb of main battery MB, input voltage Vm1 of inverter 13, torque command value TR1 and motor rotation number MRN1, when inverter 13 drives motor generator MG1, and outputs the generated signal PWC to boosting converter 12.

Further, control unit 40 generates a signal PWC for controlling switching of an NPN transistor (not shown) of boosting converter 12, based on inter-terminal voltage Vb of main battery MB, input voltage Vm2 of inverter 15, torque command value TR2 and motor rotation number MRN2, when inverter 15 drives motor generator MG2, and outputs the generated signal PWC to boosting converter 12.

Further, at the time of regenerative braking of a hybrid vehicle on which motor driving apparatus 100 is mounted, control unit 40 generates a signal PWM2 for converting the AC voltage generated by motor generator MG2 to a DC voltage, based on the input voltage Vm2 of inverter 15, torque command value TR2 and motor current MCRT2, and outputs the generated signal PWM2 to inverter 15. Here, switching of the NPN transistor (not shown) of inverter 15 is controlled by the signal PWM2. Thus, inverter 15 converts the AC voltage generated by motor generator MG2 to a DC voltage, and supplies it to boosting converter 12.

Further, at the time of regenerative braking, control unit 40 generates a signal PWC for lowering the DC voltage supplied from inverter 15, based on the inter-terminal voltage Vb of main battery MB, input voltage Vm2 of inverter 15, torque command value TR2 and motor rotation number MRN2, and outputs the generated signal PWC to boosting converter 12. Thus, the AC voltage generated by motor generator MG2 is converted to the DC voltage, lowered, and supplied to main battery MB.

Figure 6:
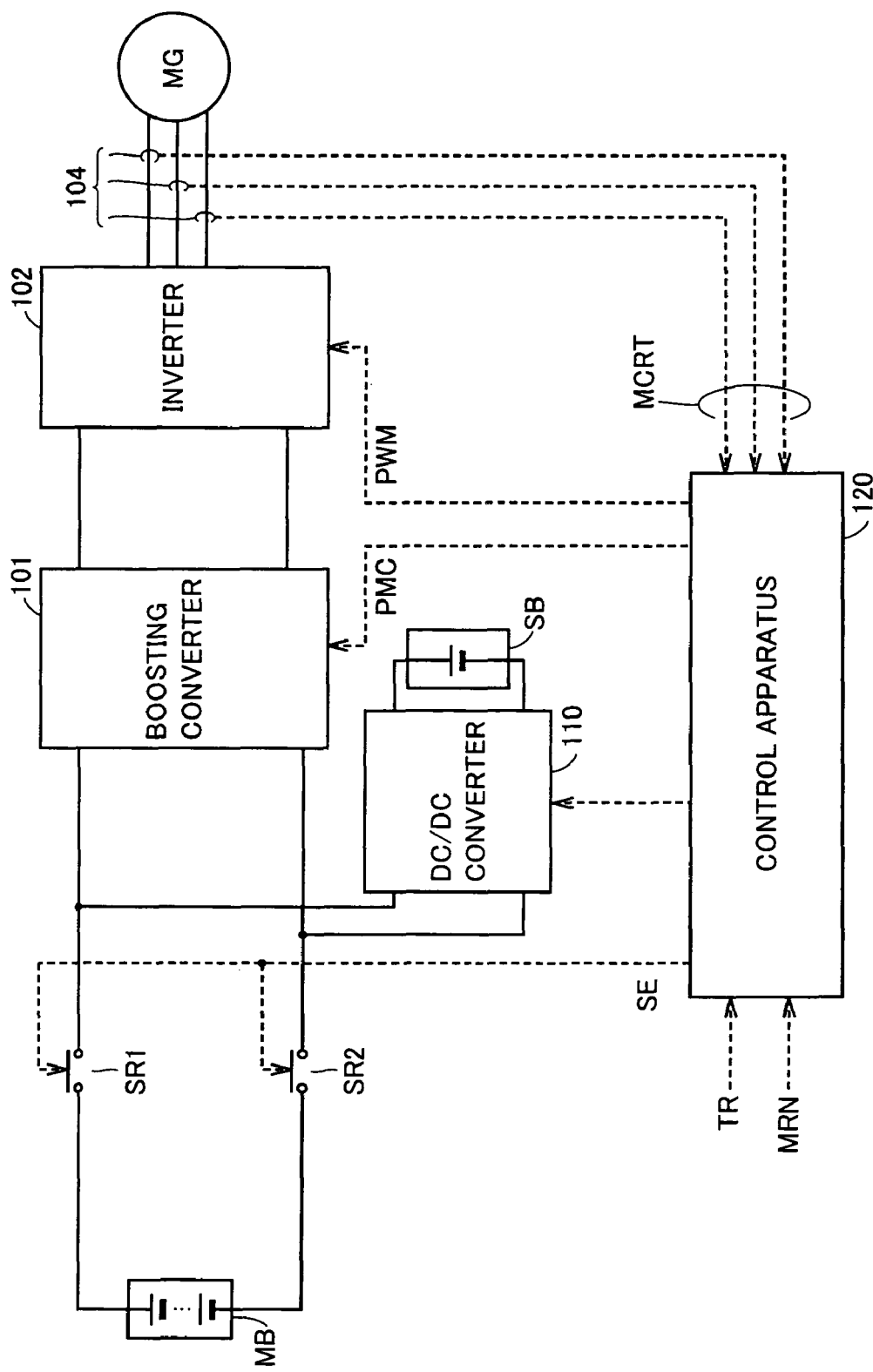
FIG. 6 is a schematic block diagram showing an example of a conventional motor driving apparatus.
Figure 7:
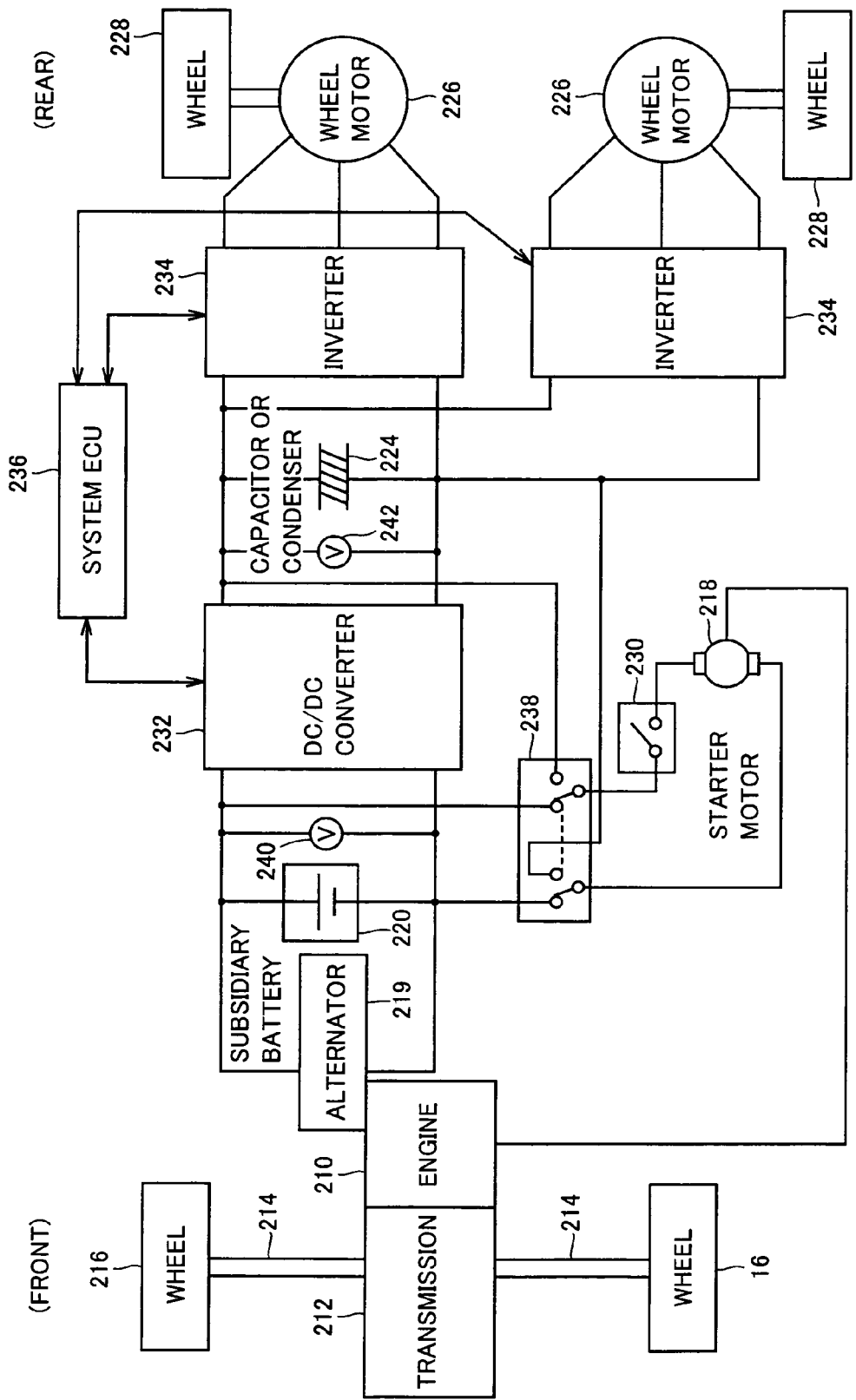
FIG. 7 is a schematic block diagram showing another example of the conventional motor driving apparatus described in Japanese Patent Laying-Open No. 11-332012.

Here, motor driving apparatus 100 in accordance with the present invention shown in FIG. 2 has the following characteristics, as compared with the conventional motor driving apparatus shown in FIG. 6.

The first characteristic is that DC/DC converter 20 is connected directly to main battery MB, not through system relays SR1 and SR2. In the conventional motor driving apparatus, DC/DC converter 110 is connected to main battery MB in response to turning-on of system relays SR1 and SR2 by the signal SE from control unit 120 when the vehicle system is activated. In contrast, according to the present embodiment, DC/DC converter 20 is always connected to main battery MB, no matter whether the vehicle system is activated or not.

The second characteristic is that DC/DC converter control circuit 30 is a high-voltage part using main battery MB as a power source. Specifically, different from control unit 40 using subsidiary battery SB as a power source, DC/DC converter control circuit 30 can operate regardless of the state of charge of subsidiary battery SB. Therefore, as will be described later, even when subsidiary battery goes dead, DC/DC converter 12 can perform a boosting operation in accordance with the control signal output from DC/DC converter control circuit 30 and the subsidiary battery SB can be charged quickly.

In the following, DC/DC converter 20 and DC/DC converter control circuit 30 mounted on motor driving apparatus 100 in accordance with the present embodiment will be described in detail.

Figure 3:
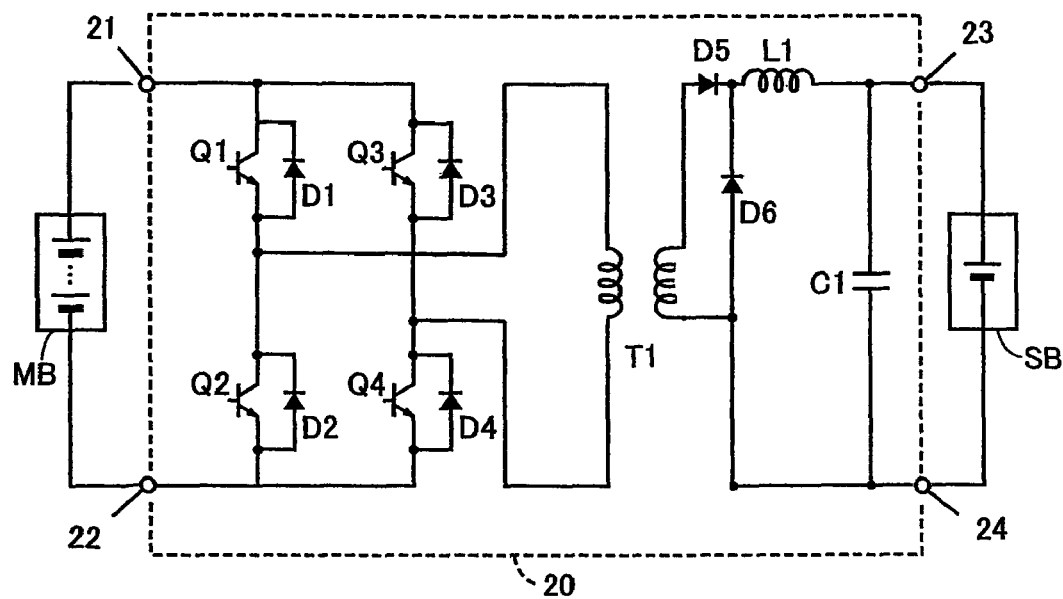
FIG. 3 is a circuit diagram of the DC/DC converter of FIG. 2.

FIG. 3 is a circuit diagram of DC/DC converter 20 shown in FIG. 2.

Referring to FIG. 3, DC/DC converter 20 includes input terminals 21, 22, photo-transistors Q1 to Q4, diodes D1 to D6, a transformer T1, a coil L1, a condenser C1 and output terminals 23, 24.

Input terminals 21 and 22 receive a DC voltage from main battery MB, and supplies the received DC voltage to opposite ends of photo-transistors Q1 and Q2 and photo-transistors Q3 and Q4.

Photo-transistors Q1 and Q2 are connected in series between the power supply voltage and the ground voltage. Photo transistors Q3 and Q4 are connected in series between the power supply voltage and the ground voltage. Photo-transistors Q1 and Q2 are connected between the power supply voltage and the ground voltage, in parallel with photo-transistors Q3 and Q4. Between the collector and emitter of each of the photo-transistors Q1 to Q4, diodes D1 to D4 causing a current to flow from the emitter side to the collector side are connected, respectively.

Figure 4:
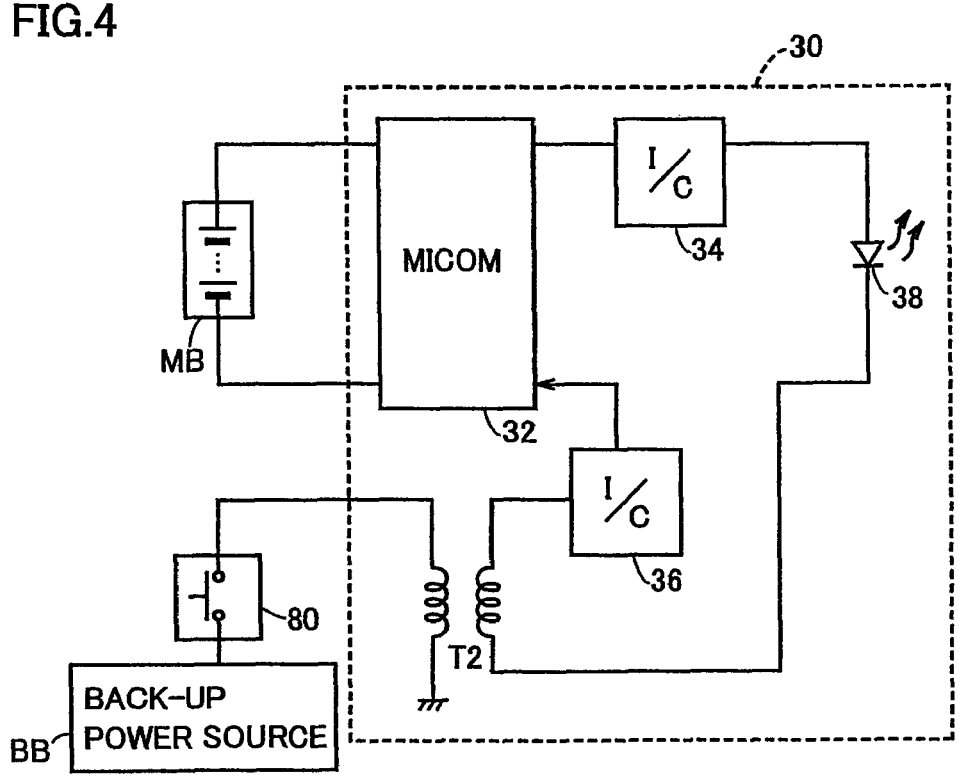
FIG. 4 is a block diagram of the DC/DC converter control circuit of FIG. 2.

Photo-transistors Q1 to Q4 form a photo coupler with a photo diode 38 of DC/DC converter control circuit 30 shown in FIG. 4, with the photo diode 38 on the input side and photo-transistors Q1 to Q4 on the output side.

As will be described later, DC/DC converter 30 outputs, as control signals, optical signals emitted by respective photo diodes of photo diode 38 to photo-transistors Q1 to Q4 of DC/DC converter 20. Receiving the optical signals from photo-diode 38 at their gates respectively, photo-transistors Q1 to Q4 are turned on/off based on the optical signal.

In the present embodiment, the switching circuit in the DC/DC converter 20 is formed by a photo coupler. This is to ensure electric insulation between the main battery MB of high voltage and the ground (body earth) of the vehicle body, as DC/DC converter control circuit 30 is formed as a high-voltage part.

Transformer T1 has its primary side coil arranged between a connection node of photo-transistors Q1 and Q2 and connection node of photo-transistors Q3 and Q4. Further, a secondary coil of transformer T1 is arranged to be opposite to the primary side coil.

Diode D5 is connected between the secondary side coil of transformer T1 and coil L1, such that a current flows from the secondary side coil of transformer T1 to coil L1.

Diode D6 is connected between the secondary side coil of transformer T1 and coil L1, such that flow of an output current from the connection node between diode D5 and coil L1 to the lower voltage side of the secondary side coil is prevented.

Coil L1 is connected between diode D5 and output terminal 23. Condenser C1 is connected between the output side of coil L1 and the ground voltage, and it smoothes and applies to output terminal 23 the output voltage from coil L1.

In the configuration described above, when photo-transistors Q1 and Q4 are turned on and photo-transistors Q2 and Q3 are turned off, an input current flows through a path of power supply voltage ~photo-transistor Q1~ primary side coil of transformer 1 ~photo-transistor Q4~ ground voltage. Then transformer T1 lowers the input voltage in accordance with turns ratio between the primary and secondary side coils, and outputs an output voltage.

On the secondary side of DC/DC converter 20, an output current flows through a path of secondary side coil of transformer T1 ~diode D5~ coil L1 ~subsidiary battery SB~ ground voltage.

In accordance with the ratio of on/off of photo-transistors Q1 and Q4, that is, the duty ratio, the input current varies and the voltage applied to transformer T1 varies. Specifically, when the on-duty of photo-transistors Q1 and Q4 increases, the input current increases and the voltage applied to transformer T1 increases. When the on-duty of photo-transistors Q1 and Q4 decreases, the input current decreases and the voltage applied to transformer T1 decreases.

Then, transformer T1 lowers the voltage applied to transformer T1 in accordance with the voltage level, and therefore, the output voltage on the secondary side of DC/DC converter varies in accordance with the voltage applied to transformer T1.

Therefore, by controlling the on-duty ratio of photo-transistors Q1 and Q4, it is possible to control the output voltage of DC/DC converter 20 to be the desired charging voltage as the target of subsidiary battery SB.

FIG. 4 is a block diagram of DC/DC converter control circuit 30 of FIG. 2.

Referring to FIG. 4, DC/DC converter control circuit 30 includes a micro computer (hereinafter also referred to as micom) 32, interfaces (I/C) 34, 36, photo diode 38, and a transformer T2.

As described above, DC/DC control circuit 30 is a high-voltage part using main battery MB as a power source. Specifically, micom 32 uses main battery MB as a power source and is activated using a signal from interface 36 as a trigger, whereby it generates a control signal for switching photo-transistors Q1 to Q4 of DC/DC converter 20.

The control signal generated by micom 32 is input through interface 34 to photo diode 38. Photo diode 38 emits light in response to the control signal input from micom 32, and outputs the emitted optical signal to photo-transistors Q1 to Q4 of DC/DC converter 20. Receiving the optical signal, photo transistors Q1 to Q4 perform a switching operation. As a result, the power of main battery MB is lowered and supplied to subsidiary battery SB.

In the configuration described above, interface 36 normally outputs a trigger signal for activating micom 32 in response to turning on of the starter switch when the vehicle system is activated.

Therefore, when the subsidiary battery goes dead and the ECU related system is not operated, the vehicle system cannot be activated and hence, the trigger signal is not applied from interface 36 to micom 32. Therefore, micom 32 cannot be activated. As a result, it becomes impossible to operate DC/DC converter 20 and to charge subsidiary battery SB.

In view of the foregoing, motor driving apparatus 100 in accordance with the present invention further includes, as the means for activating micom 32 in case the subsidiary battery goes dead, a back-up power source BB and a switch 80 for applying a signal from back-up power source BB to micom 32.

Back-up power source BB is, for example, a low voltage battery such as a button battery, which is connected to the primary side coil of transformer T2 of DC/DC converter control circuit 30. The secondary side coil of transformer T2 is connected to interface 36.

Switch 80 is a manual switch that can be turned on/off manually by, for example, the driver and, in the on state, it electrically couples the back-up power source BB to the primary side coil of transformer T2.

In the configuration described above, when subsidiary battery SB goes dead, the driver manually turns on the switch 80. When switch 80 is turned on, back-up power source BB is connected to the primary side coil of transformer T2, and a voltage is applied to the primary side coil of transformer T2. In response, to the secondary side coil of transformer T2, a voltage in accordance with the turns ratio between the primary side and secondary side coils is output.

The output voltage generated at the secondary side coil of transformer T2 is input to interface 36. When the output voltage of transformer T2 is input, interface 36 generates a signal that is activated in response to a timing when the input voltage rises, and inputs the generated signal to micom 32. Micom 32 is activated, using the input signal from interface 36 as a trigger signal. Further, in response to activation of micom 32, DC/DC converter control circuit 30 outputs a control signal to photo-transistors Q1 to Q4 of DC/DC converter 20. DC/DC converter performs a voltage lowering operation in accordance with the control signal, and charges the inter-terminal voltage of subsidiary battery SB to a desired voltage level sufficient to start engine operation. Thus, motor driving apparatus 10 can generate in motor generator MG1 the driving force necessary for starting engine operation.

Figure 5:
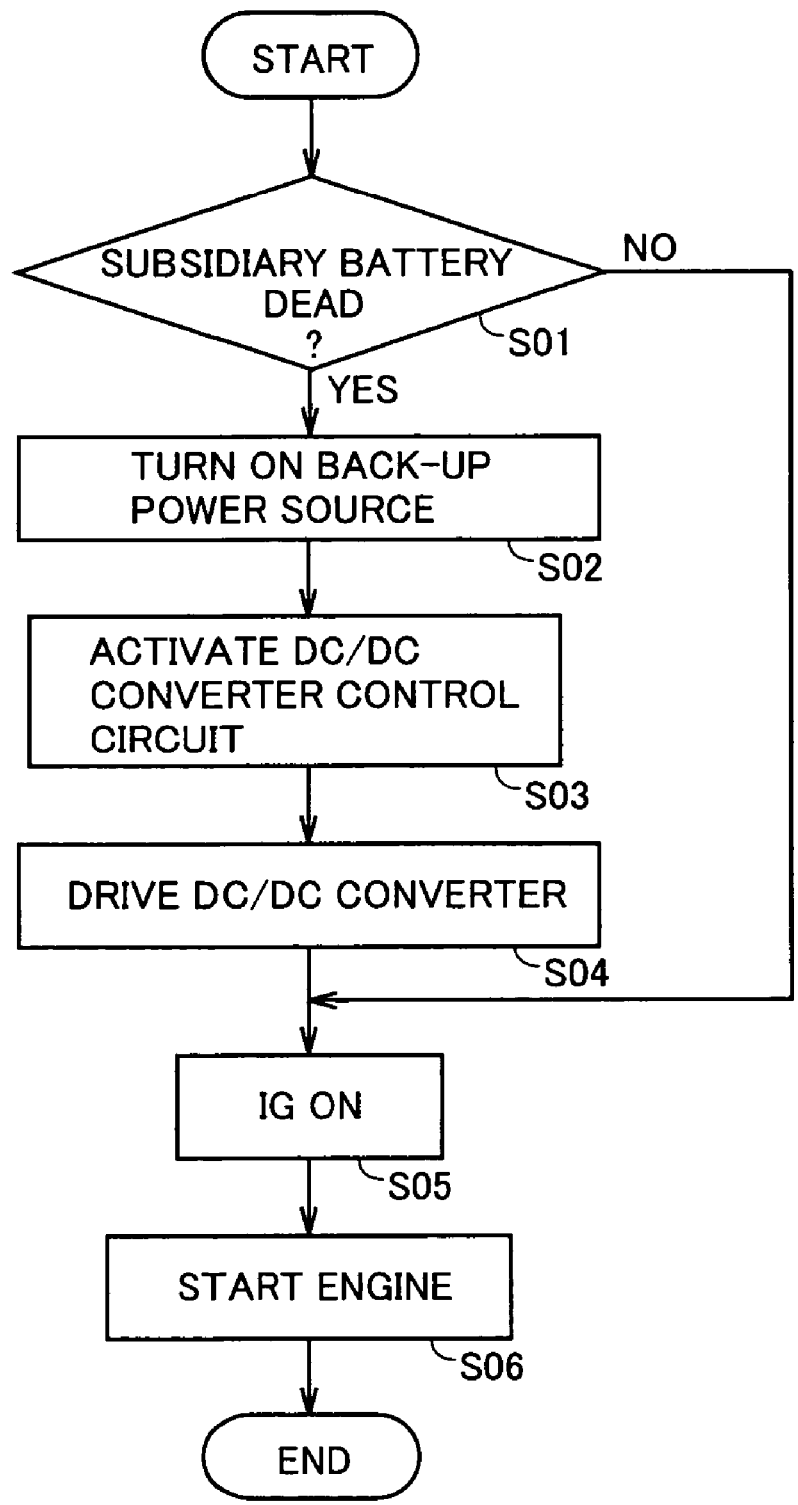
FIG. 5 is a flowchart illustrating an operation, when the subsidiary battery goes dead, of the motor driving apparatus in accordance with an embodiment of the present invention.

FIG. 5 is a flowchart illustrating an operation when the subsidiary battery is dead in the motor driving apparatus in accordance with an embodiment of the present invention.

Referring to FIG. 5, in activating the vehicle system, whether the subsidiary battery is dead or not is determined by the driver (step S01). Specifically, the state of charge of subsidiary battery SB is alarmed by display means, and the driver recognizes any abnormality of subsidiary battery SB.

When subsidiary battery SB is not found to be dead at step S01, that is, when the state of charge of subsidiary battery SB satisfies a desired level, motor driving apparatus 10 operates in response to turning-on of the ignition switch (step S05). Further, by the driving force generated in motor generator MG1, the engine operation is started (step S06).

On the other hand, if the subsidiary battery is found to be dead at step S01, the driver turns on manual switch 80, and DC/DC converter control circuit 30 is connected to back-up power source BB (step S02). Consequently, micom 32 provided in DC/DC converter control circuit 30 is activated, using the input voltage from back-up power source BB as a trigger signal.

Next, in response to activation of DC/DC converter control circuit 30, DC/DC converter 20 is driven to charge subsidiary battery SB (step S03). Specifically, after activation, DC/DC converter control circuit 30 generates a control signal for turning on/off the photo-transistors Q1 to Q4 of DC/DC converter 20, and outputs the generated control signal to DC/DC converter 20. In response to the control signal, DC/DC converter 20 performs a switching operation of photo-transistors Q1 to Q4, whereby the DC voltage of main battery MB is lowered to a desired voltage and supplied to subsidiary battery SB.

At step S04, when it is determined that the inter-terminal voltage of subsidiary battery SB has reached the desired voltage level, the vehicle system is activated. Specifically, when the ignition switch is turned on (step S05), motor driving apparatus 100 drives motor generator MG1 by the electric power of main battery MB. By the driving force of motor generator MG1, the engine is started (step S06).

In motor driving apparatus 100 in accordance with the present embodiment, when main battery MB, DC/DC converter control circuit 30 using main battery MB as a power source, DC/DC converter 20 and system relays SR1 and SR2 connected to main battery MB are integrated and housed in one box as a battery pack, it become possible to cool these components integrally, using a cooling apparatus for main battery MB. This eliminates the necessity of newly providing a cooling apparatus for DC/DC converter 20 and DC/DC converter control apparatus 30, and hence, increase in scale and cost of the apparatus can be prevented.

As described above, in accordance with the embodiment of the present invention, even when the subsidiary battery goes dead, the subsidiary battery can be charged in a simple manner without requiring a charging facility, and the motor can reliably be driven.

INDUSTRIAL APPLICABILITY

The present invention can be applied to a motor driving apparatus mounted on a hybrid vehicle.

The invention claimed is:

1. A motor driving apparatus, comprising
   a first power source that outputs a first DC voltage,
   a driving circuit receiving the first DC voltage as a supply of electric power from said first power source and driving a motor using the first DC voltage,
   a second power source charged by receiving a second DC voltage lower than the first DC voltage output from said first power source,
   a voltage converter converting said first DC voltage to said second DC voltage between said first power source and said second power source, and
   a converter control circuit controlling said voltage converter; wherein
   said converter control circuit is directly connected to said first power source and operates using said first DC voltage as a power supply voltage.

2. The motor driving apparatus according to claim 1, further comprising
   a driving circuit control circuit receiving and driven by electric power supply from said second power source, controlling said driving circuit and inputting a trigger signal for activating said converter control circuit to said converter control circuit, and
   trigger signal generating means for generating said trigger signal and inputting the signal to said converter control circuit, when amount of charges stored in said second power source is lower than a prescribed amount.

3. The motor driving apparatus according to claim 2, wherein
   said prescribed amount is an amount of electric power supply necessary for driving said driving circuit control circuit.

4. The motor driving apparatus according to claim 3, wherein
   said trigger signal generating means includes
   a third power source for generating said trigger signal, and
   a switch indicating a timing of input of said trigger signal generated by said third power source.

5. The motor driving apparatus according to claim 2, wherein
   said first power source, said second power source, said voltage converter, said converter control circuit, said driving circuit control circuit and said trigger signal generating means are housed integrally in one box,
   said driving apparatus further comprising
   a cooling apparatus for cooling said box.

* * * * *